United States Patent
Kim et al.

(10) Patent No.: US 8,562,432 B2
(45) Date of Patent: Oct. 22, 2013

(54) MOBILE TERMINAL AND METHOD FOR CONTROLLING MOTIONS USING SOUND NOISE LEVEL

(75) Inventors: Yu Jin Kim, Suwon-si (KR); Eun Jung Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1967 days.

(21) Appl. No.: 11/638,849

(22) Filed: Dec. 14, 2006

(65) Prior Publication Data

US 2007/0173319 A1     Jul. 26, 2007

(30) Foreign Application Priority Data

Jan. 24, 2006    (KR) ........................ 10-2006-0007176

(51) Int. Cl.
    *A63F 9/24*          (2006.01)
    *A63F 13/00*        (2006.01)
    *G06F 17/00*        (2006.01)
    *G06F 19/00*        (2011.01)

(52) U.S. Cl.
    USPC ................ 463/36; 463/20; 463/25; 463/33; 455/79; 455/95; 381/120

(58) Field of Classification Search
    USPC ........ 463/33, 36, 20, 25; 455/79, 95; 381/120
    See application file for complete search history.

(56) References Cited

U.S. PATENT DOCUMENTS

| | | | | |
|---|---|---|---|---|
| 4,382,159 A | * | 5/1983 | Bowditch | 381/120 |
| 4,385,541 A | * | 5/1983 | Muller et al. | 84/658 |
| 5,159,641 A | * | 10/1992 | Sopko et al. | 381/367 |
| 5,737,695 A | * | 4/1998 | Lagerqvist et al. | 455/79 |
| 2006/0016896 A1 | * | 1/2006 | Grupp | 235/492 |

FOREIGN PATENT DOCUMENTS

GB           2292443 A   *   2/1996

OTHER PUBLICATIONS

Friesen et al, Speech recognition in noise as a function of the number of spectral channels: comparison of acoustic hearing and cochlear implants, retrieved from http://www.ncbi.nlm.nih.gov/pubmed/11519582.*

* cited by examiner

*Primary Examiner* — Omkar Deodhar
*Assistant Examiner* — Adetokunbo O Torimiro
(74) *Attorney, Agent, or Firm* — The Farrell Law Firm, P.C.

(57) ABSTRACT

Provided is a device and method for controlling game motions in a mobile terminal, having an audio processing unit for converting an input sound into a digital sound, a noise level measurement unit for measuring the noise level of the digital sound, and a controller for calculating a motion control level on the motions object corresponding to the measured noise level, and controlling the corresponding motion of the motions object based on the calculated motion control level. Accordingly, the motion control for the motions object of a game can be differentially controlled according to the level of the sound noise such as wind or sound outputted through the mouth of a user without manipulating the key button with fingers.

18 Claims, 8 Drawing Sheets

FIG. 1
( PRIOR ART )

FIG. 2
( PRIOR ART )
REPLACEMENT SHEET

| NOISE LEVEL(N) (167) | MOTION LEVEL(A) (168) |
|---|---|
| A FIRST LEVEL | A FIRST MOTION LEVEL |
| A SECOND LEVEL | A SECOND MOTION LEVEL |
| ⋮ | ⋮ |

MOBILE TERMINAL AND METHOD FOR CONTROLLING MOTIONS USING SOUND NOISE LEVEL

PRIORITY

This application claims priority under 35 U.S.C. §119(a) of an application entitled "Mobile Terminal and Method For Controlling Motions Using Sound Noise Level" filed in The Korean Intellectual Property Office on Jan. 24, 2006 and assigned Serial No. 2006-0007176, the entire contents of which are incorporated herein by reference.

BACKGROUND OF THE INVENTION

1. Field of the Invention

The present invention relates generally to a method for controlling game motions in a mobile terminal, and in particular, to a mobile terminal and method for more readily controlling the level of the motions in order to obtain the desired motions result for the motions object running a game program.

2. Description of the Prior Art

Recently, mobile terminals have been equipped with a clear and wide screen liquid crystal display (LCD). With the increasing availability of data services such as an Internet, Short Message Service or e-mail, a character message or a text with various languages including, but not limited to, Korean or English can be expressed through the LCD of the mobile terminal.

The gradual improvement of the picture quality in the liquid crystal display (LCD) of the mobile terminal has made it possible to display a game, a movie, and multimedia data in a much more natural and exciting manner. The various games that can be played using the mobile terminal are provided as an on-board type or online because of the improvement of both the processing capability of a corresponding processor in the mobile terminal and the display performance of the liquid crystal display.

Figure 1:
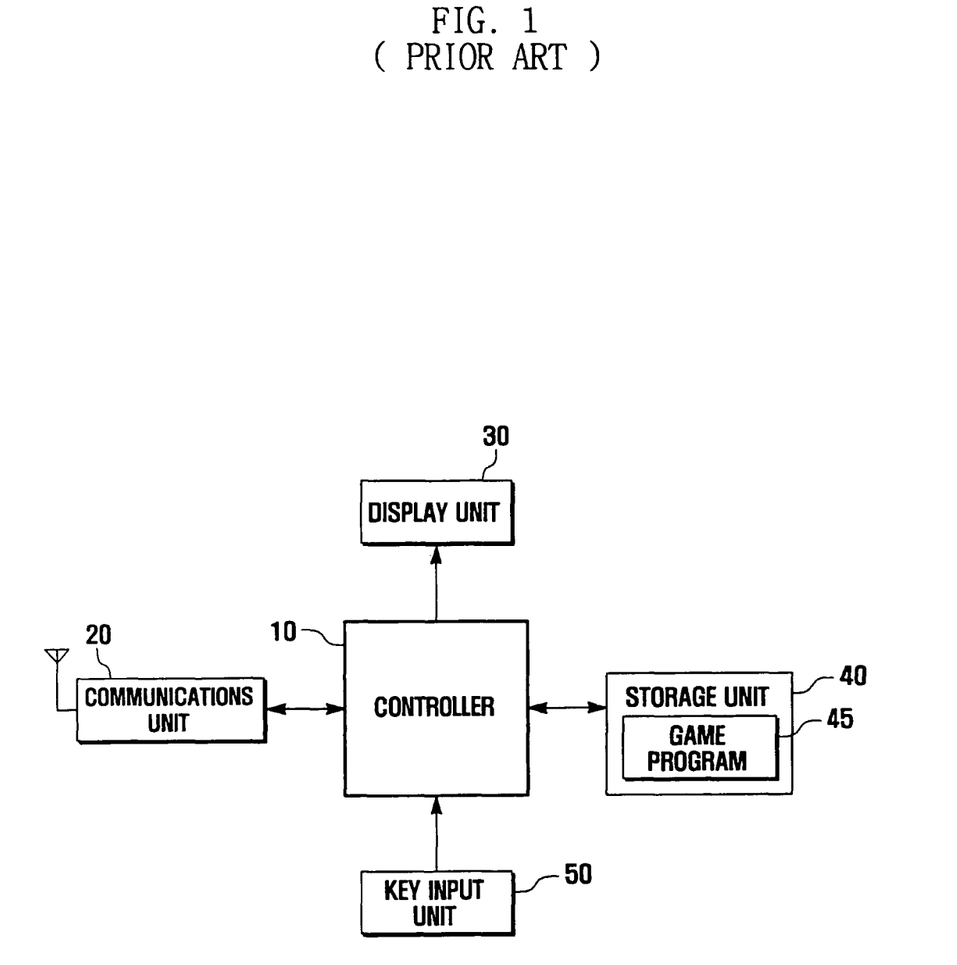
FIG. 1 is a block diagram schematically illustrating a preferred mobile terminal equipped with a conventional game mode.

FIG. 1 is a block diagram schematically illustrating a preferred mobile terminal equipped with a conventional game mode.

As shown, the mobile terminal includes a controller 10 for controlling the overall operation of the mobile terminal, a communications unit 20 for communicating through voice communications and data communications, a display unit 30 for displaying image/text information generated according to the motions status of the mobile terminal and the driving of a game, a storage unit 40 for storing programs including a game program 45 and other necessary programs for the operation of the mobile terminal, and a key input unit 50 for inputting the motion control of the mobile terminal and the manipulation of the game running.

Figure 2:
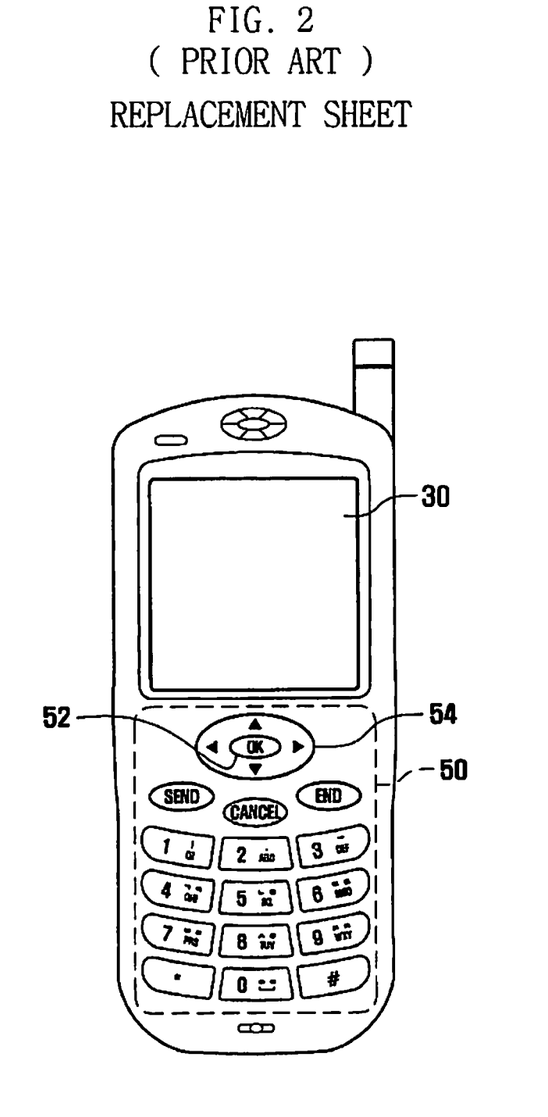
FIG. 2 is a drawing depicting a preferred key button layout disposed in the key input unit 50 of FIG. 1.

FIG. 2 is a drawing depicting a preferred key button layout disposed in the key input unit 50 of FIG. 1.

As shown, the key input unit 50 has key buttons including a Send key, a Cancel key, an End key and character/number input keys. The key input unit 50 has additional key buttons including a Verification key 52 for inputting a corresponding command, and a Directional key 54 for inputting an up-down/right-left transfer command in the corresponding menu.

The Verification key 52 is for operations including, but not limited to, inputting the command established on the motions object in game driving. The directional key 54 is for operations including, but not limited to, varying the selection of the motions object or the magnitude of a motion level in the established command. For example, the Directional key 54 is also for varying the power level of the corresponding motions performed in the motions object in performing a game.

However, it is inconvenient to manipulate the Directional key 54 for varying of the motion level in the motions object. For example, in the case of a disabled person who is unable to readily operate the key buttons of the mobile terminal with his/her fingers, it is impossible to freely enjoy playing a game using the mobile terminal.

Therefore, a simpler and more convenient method for manipulating the motion level of the motions object, rather than the method for manipulating by using the fingers, is desired for playing the corresponding game and manipulating the motions object.

SUMMARY OF THE INVENTION

It is, therefore, an object of the present invention to provide a solution at least to the problems and disadvantages of the background art.

It is another object of the present invention to provide a mobile terminal and method for more readily controlling the motion level of the motions object in order to obtain the desired result by controlling the motion of the motions object without pressing the key button.

It is still another object of the present invention to provide a mobile terminal and method for more readily establishing the motion level of the motions object and controlling the motions according to the established motion level, rather than the method for establishing the motion level of the motions object and controlling the motions by the user using his/her fingers in running programs.

According to one aspect of the present invention, there is provided a mobile terminal for changeably controlling the motion level of a motions object, that includes a noise level measurement unit for measuring the noise level of an inputted sound; and a controller for calculating a motion control level on the motions object that corresponds to the measured noise level, and for controlling the corresponding motion of the motions object based on a calculated motion control level.

In accordance with an aspect of the present invention, before controlling the corresponding motion of the motions object, the controller determines whether the motions object operates. If the motions object operates, then the controller controls the corresponding motion of the motions object by adding the calculated motion control level to the motions object. If the motions object does not operate, then the controller controls the corresponding motion of the motions object according to the calculated motion control level.

The mobile terminal according to an aspect of the present invention further includes an audio processing unit for converting the input sound into a digital signal, wherein the noise level measurement unit measures the noise level of the digital sound.

The mobile terminal according to an aspect of the present invention still further includes a storage unit for storing a noise motion level table in which the motion control level of the motions object is established, wherein the controller calculates the motion control level corresponding to the noise level of the input sound through the noise motion level table.

The mobile terminal according to an aspect of the present invention, further includes a display-unit for displaying corresponding motion status information of the motions object controlled that is based on the motion control level.

In accordance with still another aspect of the present invention, the input sound is, for example, wind or sound outputted from the mouth of a user.

In accordance with an aspect of the present invention, the motion level of the motions object is changeably controlled according to the noise level of the sound. Still another aspect of the present invention, there is provided a method for changeably controlling the motion level of a motions object in a mobile terminal that includes inputting a corresponding sound; measuring the noise level of the input sound; calculating the motion control level on the motions object corresponding to the measured noise level; and controlling the corresponding motion of the motions object based on a calculated motion control level.

In accordance with another aspect of the present invention, the step of inputting the corresponding sound includes receiving the sound through a microphone; and converting the received analog sound into a digital sound, wherein the noise level of the digital sound is measured in the noise level measurement step.

Another aspect of the present invention further includes, after calculating the motion control level, the step of determining whether the motions object operates. In the step of controlling the corresponding motion, if the motions object operates, the corresponding motion of the motions object is controlled by adding the calculated motion control level to the motions object in motion. However, in the step of controlling the corresponding motion, if the motions object does not operate, the corresponding motion of the motions object is controlled according to the calculated motion control level.

Still another aspect of the present invention further includes, before the inputting the corresponding sound, the step of establishing the motion control level of the motions object corresponding to the noise level of the sound respectively and storing the established motion control level into the noise motion level table. In step of calculating the motion control level, the motion control level corresponding to the noise level of the sound is calculated through the noise motion level table. The input sound is, for example, wind or sound output from the mouth of a user. The motion level of the motions object is changeably controlled according to the noise level of the sound.

According to the present invention, the noise level of a sound input through a microphone in a game playing is measured and thus, the motion level of the motions object correspondingly established is produced, and accordingly, the motion of the motions object is controlled. Accordingly, the motion control for the motions object of a game can be differentially controlled according to the noise level of the input sound such as wind or sound, for example output through the mouth of a user without the user manipulating the key buttons with his/her fingers.

BRIEF DESCRIPTION OF THE DRAWINGS

The invention will be described in detail with reference to the following drawings in which like numerals refer to like elements. The accompany drawings, which are included to provide a further understanding of the present invention and are incorporated herein and constitute a part of this specification, illustrate embodiments of the invention and together with the description serve to further explain the principles of the present invention. In the drawings.

DETAILED DESCRIPTION OF PREFERRED EMBODIMENTS

Preferred embodiments of the present invention will be described in detail with reference to the accompanying drawings. Reference will now be made in detail to embodiments of the present invention, examples of which are illustrated in the accompanying drawings.

Hereinafter, preferred embodiments of the present invention will be described in detail with reference to the attached drawings.

Figure 3:
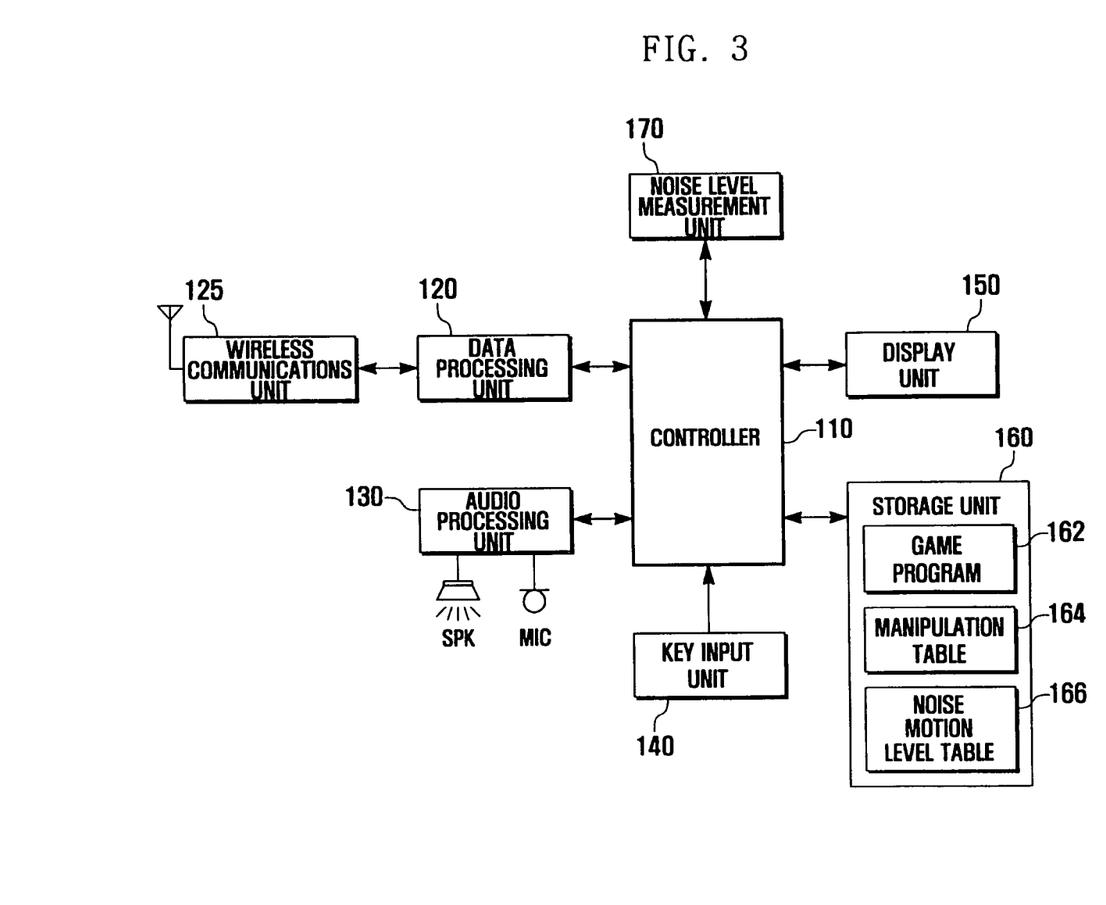
FIG. 3 is a schematic block diagram illustrating a mobile terminal that can control the motions object by using the noise level according to the present invention.

FIG. 3 is schematic a block diagram illustrating the mobile terminal that can control the motions object by using a noise level according to the present invention.

As shown, the mobile terminal of the present invention includes a controller 110, a data processing unit 120, a wireless communications unit 125, an audio processing unit 130, a key input unit 140, a display unit 150, a storage unit 160 and a noise level measurement unit 170.

The controller 110 performs the overall control operations of the mobile terminal. The controller 110 according to the present invention executes the game program and controls the driving of the game, thereby controlling the motion of the motions object through the motion level of the motions object according to the noise level of inputted sound received through a microphone coupled to the audio processing unit 130.

The data processing unit 120 includes a transmission module for encoding and modulating the signal for wireless transmission, and a receiver module for decoding and demodulating the wirelessly received signal. According to the embodiment, the data processing unit 120 decodes/demodulates the game program received through the communications channel and the information on motions, and provides them to the controller 110. Moreover, while the mobile terminal performs the on-line game through the established communications channel, the data processing unit 120 encodes/modulates the command of the execution/termination of the corresponding game in operating and the motion control command of the motions object, thereafter outputting them to the wireless communications unit 125. The data processing unit 120 decodes/demodulates the status of the game and the status information of the motions object, thereafter outputting them to the controller 100.

The wireless communications unit 125 performs the transmission-receiving function with the data for the wireless communications of the mobile terminal. The wireless communications unit 125 includes an RF transmitter (not shown) for upconverting and amplifying the frequency of the transmitted signal, and a low noise RF receiver (not shown) for amplifying the received signal and downwardly transforming the frequency. The wireless communications unit 125 according to the present invention receives the game program through the communications channel, and thereafter outputs it to the data processing unit 120. Further, while in the running status of the on-line game, the wireless communications unit 125 receives the game status information/motions object status information through the communications channel, and thereafter outputs them to the data processing unit 120. The wireless communications unit 125 receives the control command and the motion control command of motions object for the performance of the game program from data processing unit 120, and thereafter transmits them through the communications channel.

The audio processing unit 130 may be a Coder/Decoder (CODEC). The CODEC can include a data codec for processing the packet data and an audio codec for processing a audio signal such as voice. The audio processing unit 130 converts the digital audio signal received in data processing unit 120 into the analog signal through the audio codec, and thereafter reproduces it and outputs it through a speaker in the voice communications of the mobile terminal. Further, the audio processing unit 130 converts the analog audio signal inputted from a microphone into the digital audio signal through the audio codec, and thereafter can provide it to the data processing unit 120 through the controller 110. At this time, the CODEC can be separately provided from or can be included in the controller 110. In the present invention, the audio processing unit 130 converts the analog sound received from a microphone into the digital format for the control of the motions object using the noise level of the sound noise, and thereafter providing it to the noise level measurement unit 170 through the controller 110.

The key input unit 140 includes a plurality of control keys for inputting a number and character information and a plurality of keys for motion control of the mobile terminal. The key input unit 140 according to the present invention is equipped with keys required for the command input for the execution/termination of the game program and for the motion level establishment of the motions object according to the noise level of the sound input.

The display unit 150 displays the status information according to the motion of the mobile terminal under the control of the controller 110. The Liquid Crystal Display (LCD) can be applied to the display unit 150. In this case, the display unit 150 may include a LCD controller, a memory storing video data and a LCD display apparatus. At this time, in case LCD is implemented in a touch screen type, it may be used as an input interface. The display unit 150 displays the status information of the game program in operation under the control of the controller 110, indicating the motion level information for controlling the motion of the motions object.

The storage unit 160 stores programs executable in the mobile terminal and data resulting from program execution. According to the present invention, the storage unit 160 stores an executable game program 162, a manipulation table 164 in which a guide information for the game playing according to the manner in which the execution of the game program 162 is set up, and a noise motion level table 166 in which the motion level of the motions object according to the level of the sound noise inputted through a microphone in the game playing is established. At this time, the noise level of the sound noise is indicated in dB.

The noise level measurement unit 170 measures the noise level of the digital sound under the control of the controller 110, when the analog sound received through the microphone is transformed into the digital signal by the audio processing unit 130 and is provided to the noise level measurement unit 170. The noise level measurement unit 170 produces the measured sound noise level as dB units.

The controller 110 calculates the motion control level value of the motions object established corresponding to the sound noise level measured in the noise level measurement unit 170, with reference to a noise motion level table 166 per noise stored in the storage unit 160.

Accordingly, the controller 110 controls the motion of the motions object in a game playing corresponding to the calculated motion control level value. For example, if the rolling ball game is performed in the mobile terminal, the controller 110 controls the ball equivalent to the motions object, to move an equivalent distance corresponding to the moving distance value which is the calculated motion control level value.

Therefore, the sound noise level inputted through the microphone in operating the game is measured. Accordingly, the motion level of the motions object established in accordance with the sound noise level is calculated for controlling the motion of the motions object. Thus, by controlling the motion of the motions object, the motion control of the motions object in a game can be differentially performed according to the level of the sound noise such as wind or sound outputted through the mouth of a user without manipulating the key button with fingers.

Figure 4:
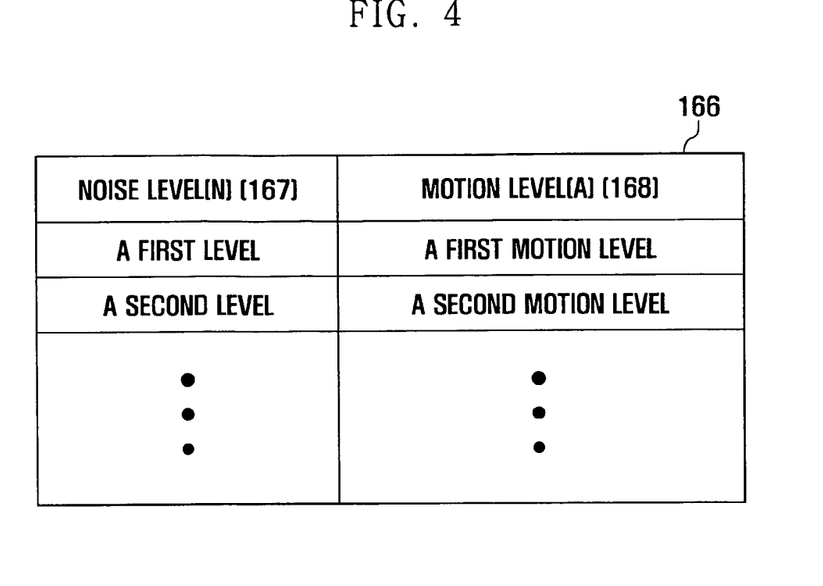
FIG. 4 is a drawing illustrating a preferred motion level table per noise stored in the storage unit of FIG. 3 according to the present invention.

FIG. 4 is a drawing illustrating a preferred motion level table per noise stored in the storage unit 160 of FIG. 3.

As shown, the noise motion level table per noise 166 comprises a noise level N 167 measured on the sound noise inputted through a microphone, and a motion level A 168 established on the corresponding motions object corresponding to each of the measured noise level N 167.

The controller 110 calculates the motion control level corresponding to the measured level of the sound noise with reference to the noise motion level table 166 established as described above.

Figure 5:
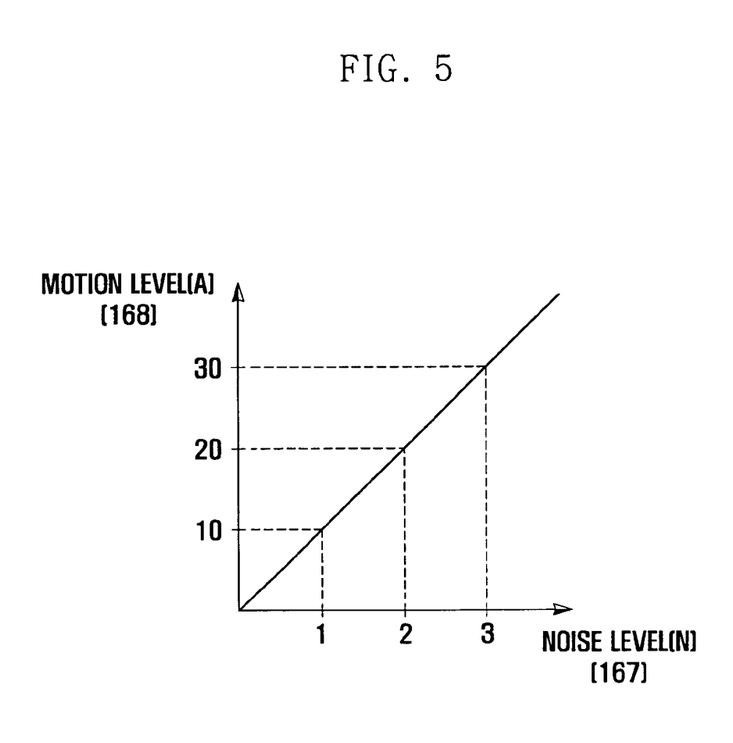
FIG. 5 is a graph schematically illustrating the motion level according to a noise level based on FIG. 4 according to the present invention.

FIG. 5 is a graph schematically illustrating the motion level according to a noise level based on FIG. 4, of the motion level table 166 per noise, illustrating that, as the noise level N 167 increases, the motion level A 168 of the motions object is proportionally increased.

Figure 6:
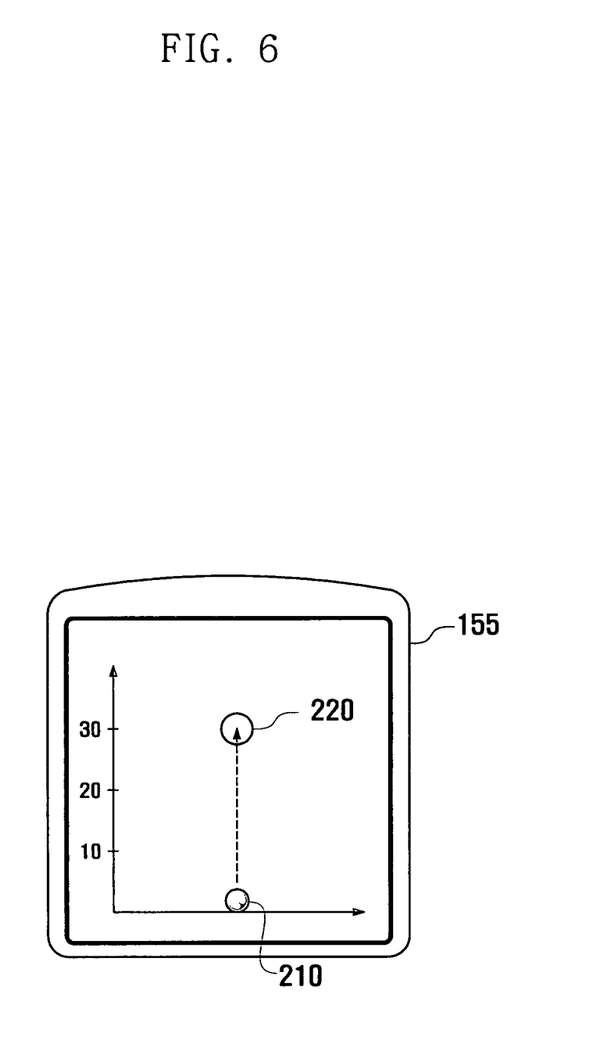
FIG. 6 is a drawing illustrating a preferred status where a rolling ball game during operation is displayed on a display screen according to the present invention.

FIG. 6 is a drawing illustrating a preferred status where a rolling ball game during operation is indicated on a display screen according to the present invention.

As shown, the status where the rolling ball game is in operating is displayed in the display screen 155, while the distance 30 from the indicated ball 210 to the target 220 has no units of measurement.

In accordance with FIG. 5 and FIG. 6, when the noise level is level 1, the controller 110 controls the ball 210 to move as much as distance 10. Further, when the noise level is level 2, the controller 110 controls the ball 210 to move as much as distance 20, while the controller 110 controls the ball 210 to move as much as distance 30 when the noise level is level 3.

Figure 7:
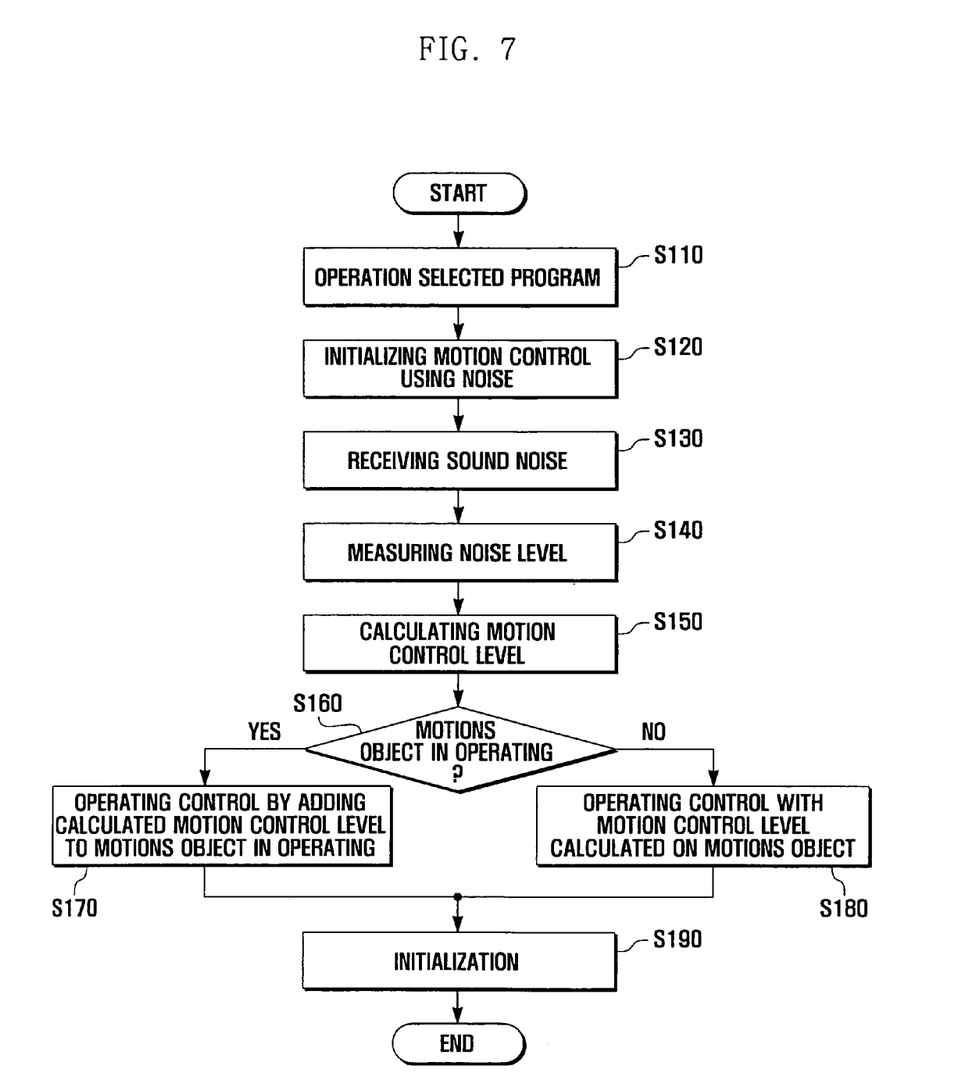
FIG. 7 is a flowchart illustrating a method for controlling the motions object by utilizing the noise level in operating in a mobile terminal according to the present invention.

FIG. 7 is a flowchart illustrating a method for controlling the motions object by utilizing the noise level in operating in a mobile terminal according to the present invention.

The controller 110 operates a selected game program according to the game operation command at step S110. The controller 110 initializes the motion control mode as a motion control mode using noise, when the motion control mode command according to the level of the sound noise is inputted on the motions object in operating the game at step S120.

Accordingly, the controller 110 controls the audio processing unit 130 to convert an analog sound such as mouth wind of the user received through the microphone into a digital sound at step S130. The controller 110 controls the noise level measurement unit 170 to measure the noise level of the digital sound at step S140. The controller 110 produces the motion control level of the established motions object in accordance with the measured noise level at step S150.

The controller 110 determines whether the motions object for controlling moves, when the motion control level is calculated according to the noise level at step S160. If the motions object is moving, the controller 110 controls the motion of the motions object by adding the calculated motion control level to the motions object in operating at step S170. If the motions object is not moving, the controller 110 controls the motion of the motions object with the motion control level calculated on the motions object at step S180. If steps S170 and S180 are performed, the controller 110 initializes the motion of the motions object at step S190.

Therefore, the noise level of the sound such as mouth wind of the user received through a microphone is measured for calculating the motion control level of the motions object accordingly established. The motion of the motions object is differentially controlled according to the calculated motion control level. In that way, the motion control of the motions object can be more readily performed by using the sound of the user.

Figure 8:
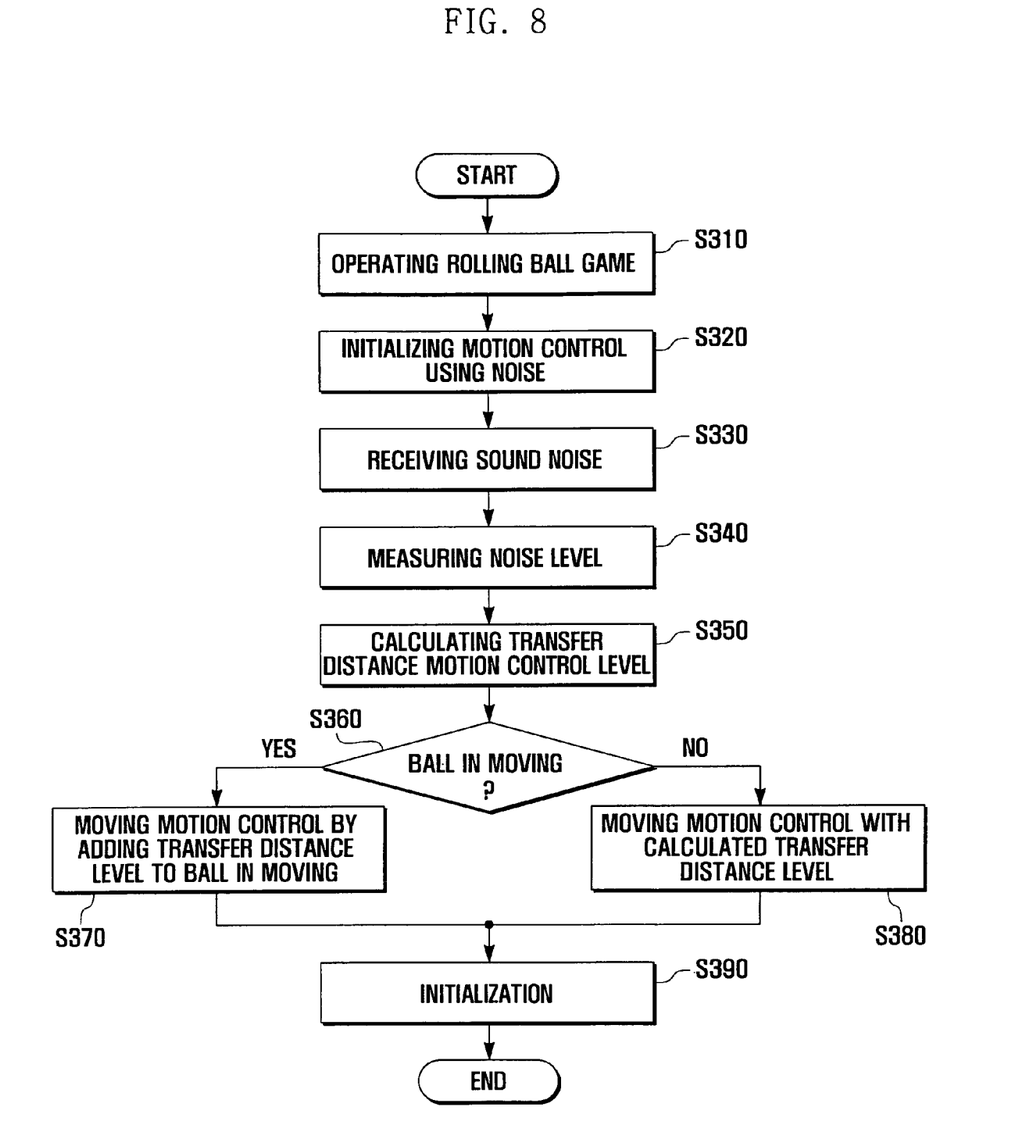
FIG. 8 is a flowchart illustrating a method for controlling the distance a ball moves by using the noise level in operating a rolling ball game in a mobile terminal according to the present invention.

FIG. 8 is a flowchart illustrating a method for controlling the distance a ball moves by using the noise level in operating a rolling ball game in a mobile terminal according to the present invention.

Firstly, the controller 110 runs the selected rolling ball game program according to the game operation command at step S310. The controller 110 initializes the motion control mode as motion control mode using the noise, if the command for controlling the movement distance according to the level of the sound noise is inputted on the ball in operating the rolling ball game at step S320.

Accordingly, the controller 110 controls the audio processing unit 130 to convert the analog sound such as mouth wind of the user received through the microphone into a digital sound at step S330. The controller 110 controls the noise level measurement unit 170 to measure the noise level of the digital sound at step S340. The controller 110 calculates the movement distance control level on the ball established in accordance with the measured noise level at step S350.

If the movement distance level of the ball is calculated according to the noise level, the controller 110 determines whether the ball for controlling is in moving at step S360. If the ball is moving, the controller 110 controls the distance the ball moves by adding the calculated movement distance control level to the moving ball at step S370. Otherwise, if the ball is not moving, the controller 110 controls the ball to move as much distance corresponding to the calculated movement distance control level at step S380. If steps S370 and S380 are performed, the controller 110 initializes the moving of the ball at step S390.

Figure 9:
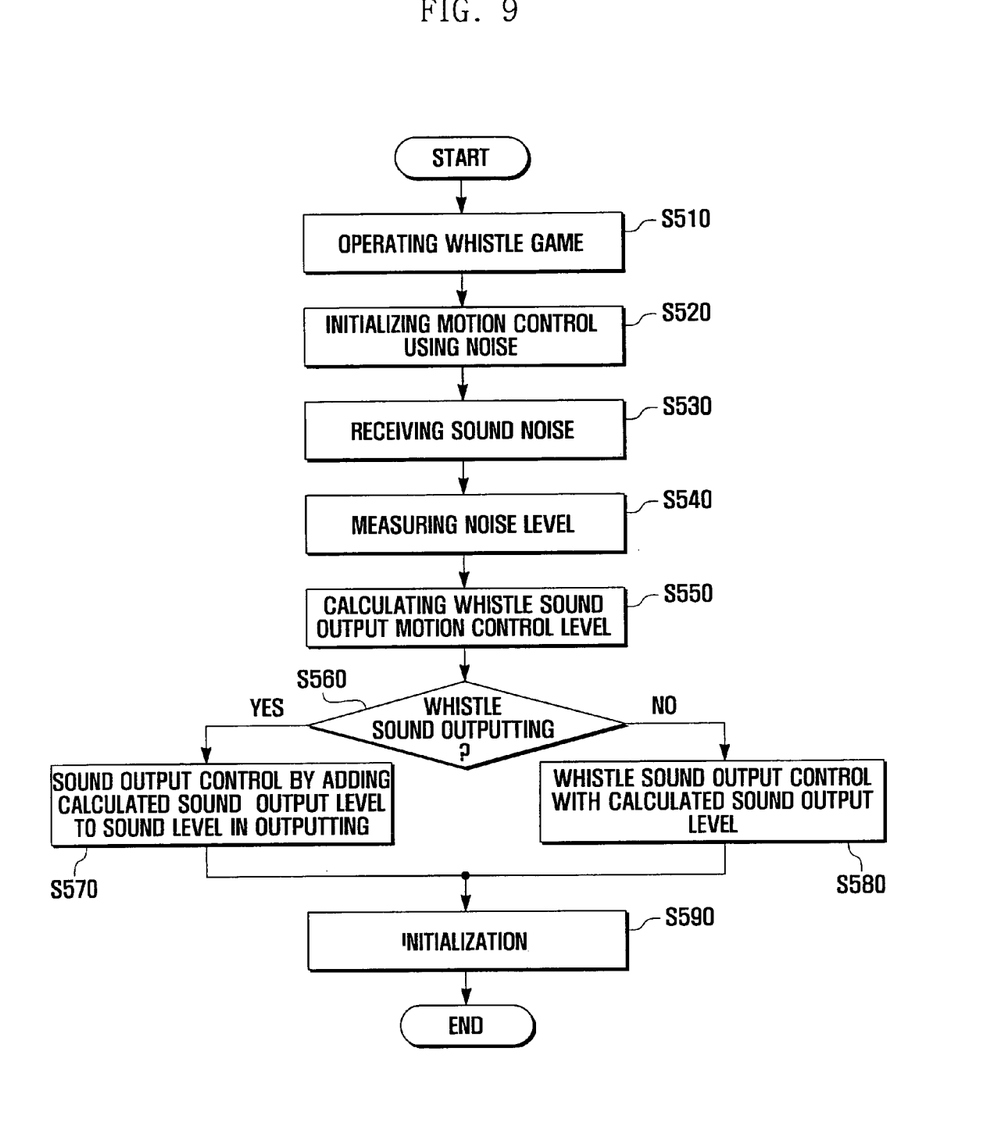
FIG. 9 is a flowchart illustrating a method for controlling the magnitude of a whistle sound output by utilizing the noise level in operating a whistle game in a mobile terminal according to the present invention.

FIG. 9 is a flowchart illustrating a method for controlling the magnitude of a whistle sound output by using utilizing the noise level in operating a whistle game in a mobile terminal according to the present invention.

Firstly, the controller 110 runs the selected whistle game program according to the game operation command at step S510. The controller 110 initializes the motion control mode using the noise, if the command for controlling the sound output level according to the level of the sound noise is inputted on the whistle in operating the whistle game at step S520.

Accordingly, the controller 110 controls the audio processing unit 130 to convert the analog sound such as mouth wind of the user received through the microphone into a digital sound at step S530. The controller 110 controls the noise level measurement unit 170 to measure the noise level of the digital sound at step S540. The controller 110 calculates the sound output level of the whistle established in accordance with the measured noise level at step S550.

If the sound output level of the whistle is calculated according to the noise level, the controller 110 determines whether the sound of the whistle for controlling is being output at step S560. If the sound of the whistle is being output, the controller 110 controls the sound output level to output the sound output level by adding the calculated sound output level at step S570. Otherwise, if the sound of the whistle is not being output, the controller 110 controls the whistle sound output to output the whistle sound in the calculated sound output level at step S580. If steps S570 and S580 are performed, the controller 110 initializes the operation of whistle sound outputting at step S590.

As described above, as a preferred embodiment of the present invention, a game where the motion level of the motions object according to the level of the sound noise on the motions object is controlled is disclosed. However, the present invention is not restricted to a specific content, but clarifies that arbitrary contents which need a variable motion level control by the level of the sound noise on the arbitrary motions object can be applied the same.

According to the present invention, the level of a sound noise inputted through a microphone while game playing is measured and the motion level of the motions object correspondingly established is produced, thus, the motion of the motions object is controlled. Accordingly, the motion control for the motions object of a game can be differentially controlled according to the level of the sound noise such as wind or sound outputted through the mouth of a user without manipulating the key button with his/her fingers. Furthermore, the present invention may be applicable to and available for any other devices other than a mobile terminal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal for changeably controlling a motion level of a motions object, the mobile terminal comprising:
   a noise level measurement unit for measuring a noise level of an input sound; and
   a controller for calculating a motion control level on the motions object corresponding to the measured noise level, and controlling a corresponding motion of the motions object based on the calculated motion control level.

2. The mobile terminal of claim 1, wherein the controller, before controlling the corresponding motion of the motions object, determines whether the motions object operates, where if the motions object operates, the controller controls the corresponding motion of the motions object by adding the calculated motion control level to the motions object in motion.

3. The mobile terminal of claim 2, wherein the controller, before controlling the corresponding motion of the motions object, determines whether the motions object operates, where if the motions object does not operate, the controller controls the corresponding motion of the motions object according to the calculated motion control level.

4. The mobile terminal of claim 1, wherein the controller, before controlling the corresponding motion of the motions object, determines whether the motions object operates, where if the motions object does not operate, the controller controls the corresponding motion of the motions object according to the calculated motion control level.

5. The mobile terminal of claim 1, further comprising an audio processing unit for converting the input sound into a digital sound, wherein the noise level measurement unit measures the noise level of the digital sound.

6. The mobile terminal of claim 1, further comprising a storage unit for storing a noise motion level table in which the motion control level of the motions object is established, wherein the controller calculates the motion control level corresponding to the noise level of the sound through the noise motion level table.

7. The mobile terminal of claim 1, further comprising a display unit for displaying corresponding motion status information of the motions object controlled based on the motion control level.

8. The mobile terminal of claim 1, wherein the input sound is mouth wind outputted from the mouth of a user.

9. The mobile terminal of claim 1, wherein the motion level of the motions object is changeably controlled according to the noise level of the sound.

10. A method for changeably controlling a motion level of a motions object in a mobile terminal, the method comprising the steps of:
inputting a corresponding sound;
measuring the noise level of the input sound;
calculating a motion control level on the motions object corresponding to the measured noise level; and
controlling the corresponding motion of the motions object based on the calculated motion control level.

11. The method of claim 10, wherein the step of inputting the corresponding sound comprises:
receiving the input sound through a microphone; and
converting the received analog sound into a digital sound, wherein the noise level of the digital sound is measured in the noise level measurement step.

12. The method of claim 11, further comprising, after the step of calculating the motion control level, determining whether the motions object operates wherein, in the step of controlling the corresponding motion, if the motions object operates, the corresponding motion of the motions object is controlled by adding the calculated motion control level to the motions object in motion.

13. The method of claim 12, wherein, in the step of controlling the corresponding motion, if the motions object does not operate, the corresponding motion of the motions object is controlled according to the calculated motion control level.

14. The method of claim 10, further comprising, after the step of calculating the motion control level, determining whether the motions object operates wherein, in the step of controlling the corresponding motion, if the motions object operates, the corresponding motion of the motions object is controlled by adding the calculated motion control level to the motions object in motion.

15. The method of claim 14, wherein, in the step of controlling the corresponding motion, if the motions object does not operate, the corresponding motion of the motions object is controlled according to the calculated motion control level.

16. The method of claim 10, further comprising, before the step of inputting the corresponding sound, establishing the motion control level of the motions object corresponding to the noise level of the sound respectively and storing the established motion control level into a noise motion level table, and wherein, in step of calculating the motion control level, the motion control level corresponding to the noise level of the sound is calculated with the noise motion level table.

17. The method of claim 10, wherein the sound is mouth wind outputted from the mouth of a user.

18. The method of claim 10, wherein the motion level of the motions object is changeably controlled according to the noise level of the sound.

* * * * *